United States Patent
Von Trotha et al.

(10) Patent No.: US 8,361,198 B2
(45) Date of Patent: Jan. 29, 2013

(54) PROCESS AND DEVICE FOR THE SEPARATION OF FOREIGN GASES FROM A REDUCING USEFUL GAS BY STEAM-DRIVEN PRESSURE SWING ADSORPTION

(75) Inventors: Thilo Von Trotha, Selm (DE); Vincent Liu, Bochum (DE); Michael Wyschofsky, Dortmund (DE)

(73) Assignee: UHDE GmbH, Dortmund (DE)

( * ) Notice: Subject to any disclaimer, the term of this patent is extended or adjusted under 35 U.S.C. 154(b) by 261 days.

(21) Appl. No.: 12/736,046

(22) PCT Filed: Feb. 17, 2009

(86) PCT No.: PCT/EP2009/001092
§ 371 (c)(1),
(2), (4) Date: Nov. 17, 2010

(87) PCT Pub. No.: WO2009/109290
PCT Pub. Date: Sep. 11, 2009

(65) Prior Publication Data
US 2011/0061529 A1 Mar. 17, 2011

(30) Foreign Application Priority Data
Mar. 5, 2008 (DE) .......................... 10 2008 012 735

(51) Int. Cl.
*B01D 53/047* (2006.01)
*C01B 3/56* (2006.01)
(52) U.S. Cl. ................. 95/96; 95/139; 96/130
(58) Field of Classification Search .............. 95/96, 139, 95/148; 96/121, 130
See application file for complete search history.

(56) References Cited

U.S. PATENT DOCUMENTS

| | | | |
|---|---|---|---|
| 3,141,748 A | 7/1964 | Hoke et al. | |
| 5,203,888 A * | 4/1993 | Maurer | ........................... 95/101 |
| 5,989,315 A | 11/1999 | Stuart et al. | |
| 6,322,612 B1 | 11/2001 | Sircar et al. | |
| 6,740,258 B1 | 5/2004 | Wyschofsky et al. | |
| 7,122,099 B1 | 10/2006 | Schumacher et al. | |
| 7,678,179 B2 | 3/2010 | Uji | |

(Continued)

FOREIGN PATENT DOCUMENTS

| DE | 600 10 037 T2 | 3/2005 |
|---|---|---|
| EP | 0 015 413 B1 | 2/1983 |

(Continued)

*Primary Examiner* — Frank Lawrence, Jr.
(74) *Attorney, Agent, or Firm* — Marshall & Melhorn, LLC (57) ABSTRACT

A process is described for purifying synthesis gas by means of a pressure swing adsorption unit which is desorbed by a vacuum produced by a so-called ejector, which is driven by steam generated by a heat exchanger which uses the heat in the flue gas duct or in the useful-gas duct for the generation of steam. The pressure swing adsorption unit is operated advantageously in cyclic turns of adsorption under excess pressure, depressurization desorption and vacuum desorption and the gas desorbed by the ejector being cooled in a cooler so that the contained steam can be condensed and discharged or is advantageously returned to the feed gas for the synthesis gas production. The foreign gas desorbed by the pressure swing adsorption unit, which contains at least partly not yet consumed fuel gas, is recycled to the fuel gas. In an advantageous embodiment, the vacuum from the ejector is stored in an intermediate tank and applied to the pressure swing adsorption unit according to the vacuum desorption cycle. Also disclosed is a device for running this process.

16 Claims, 2 Drawing Sheets

U.S. PATENT DOCUMENTS

2008/0014126 A1  1/2008  Bender et al.
2008/0090113 A1* 4/2008  Keefer et al. .................. 429/17
2008/0290322 A1  11/2008 Hederer et al.

FOREIGN PATENT DOCUMENTS

| | | |
|---|---|---|
| EP | 0 864 351 A2 | 9/1998 |
| EP | 0 968 748 A2 | 1/2000 |
| EP | 1 230 321 B1 | 5/2005 |
| EP | 1 101 731 B1 | 1/2006 |
| EP | 1 813 866 A2 | 8/2007 |
| EP | 1 878 782 A1 | 1/2008 |
| WO | WO 2006/119812 A1 | 11/2006 |

* cited by examiner

PROCESS AND DEVICE FOR THE SEPARATION OF FOREIGN GASES FROM A REDUCING USEFUL GAS BY STEAM-DRIVEN PRESSURE SWING ADSORPTION

BACKGROUND OF THE INVENTION

The invention relates to a process for purifying a reducing useful gas by pressure swing adsorption using a so-called ejector operated by a pressurised gas and generating a vacuum which serves to improve the desorption efficiency of the pressure swing adsorption unit, in which the invention uses steam as pressurised gas generated by the heating device in the production of the useful gas. The invention also relates to a device with an ejector operated by steam, the vacuum of which is used to increase the desorption efficiency of the pressure swing adsorption unit.

The production of reducing gases is a process frequently used in technical applications. An example for the production of a reducing gas is the steam reforming process. By heating a hydrocarbonaceous feed mixture with steam, it is, for instance, possible to produce synthesis gas consisting of a mixture of hydrogen, carbon monoxide and carbon dioxide. Synthesis gas is frequently used as fuel gas or feedstock for chemical syntheses. Another frequently produced reducing gas is carbon monoxide.

Most applications require a reducing gas which is free of accompanying gases. A frequently occurring accompanying gas is carbon monoxide which is obtained from the incineration or reforming processes. If the carbon monoxide from the synthesis gas is converted in the so-called CO conversion in the presence of steam, the result is a mixture of hydrogen and carbon dioxide. The latter can be removed from the synthesis gas by various processes. When the carbon dioxide is removed, pure hydrogen is obtained which is an essential feedstock in many syntheses and applications. Other frequently occurring accompanying or foreign gases or foreign gas components which are undesired constituents of reducing gases and need to be separated are residual gas components such as methane and nitrogen.

Many applications include gas-scrubbing processes for the separation of undesired accompanying gases, which are suited for the mentioned applications. Also frequently used are the so-called pressure swing adsorption units in which the gas to be separated undergoes adsorption processes. Pressure swing adsorption units are capable of removing foreign gases almost completely, which can be achieved by gas-scrubbing processes on certain conditions only.

Pressure swing adsorption units use the adsorptive capacity of adsorbing materials. Examples of frequently used adsorbing materials are activated carbon, molecular sieves, silica gel or zeolithes. For gas purification purposes, the adsorbing materials are packed into suitable vessels and the gas to be purified is passed through these vessels under pressure. The foreign gas components are thus adsorbed and the purified useful gas is obtained. After a certain time, the adsorptive capacity of the adsorbing material will be exhausted. The vessel is depressurised and flushed with useful gas so that the adsorbing material releases the adsorbed foreign gas. Subsequently the foreign gas is discharged for further processing or removal. The adsorption and desorption processes are performed in cyclic alternation so that it is possible to ensure a continuous purification process of the supplied useful gas.

In order to further improve the efficiency of the adsorption process, the desorption process can be supported by applying a vacuum after pressure relief. This will allow almost complete removal of the adsorbed foreign gas from the adsorbing material. Subsequently it will be possible to re-use all of the adsorbing material in the next adsorption process. To avoid that vacuum has to be generated by an expensive compressor or other machine, a so-called ejector is used. This ejector uses the pressure of the discharged gas to generate a vacuum by utilizing the Venturi effect. By controlling the valves in a suitable way to ensure that the discharged gas flows through the ejector, it is possible to achieve adequate evacuation of the pressure swing adsorption vessels.

EP 015413 B1 describes a pressure swing adsorption process which includes an arrangement of pressure swing adsorption units which, in cyclic alternation, remove a specific component or several gas components by selective adsorption from a gas mixture. A vacuum generated by means of an ejector is used to desorb the adsorbed foreign gases step by step. The ejector is operated by the pressure of the gases discharged from the pressure swing units, allowing the use of both the discharged useful gas and the discharged desorbed foreign gas if the pressure swing adsorption units and the valves are connected in an appropriate way.

EP 1101731 A1 describes a process for the production of synthesis gas in connection with a pressure swing adsorption unit by which the synthesis gas is freed from the entrained carbon dioxide. The vacuum for the desorption of the pressure swing unit is generated by an ejector which uses the high pressure of the fuel gas when being supplied. The gas leaving the ejector may then be re-used as fuel gas. By a system of feed vessels, both the fuel gas and the vacuum can be adapted to the capacity required.

The vacuum generated by the ejectors, however, is frequently inadequate. For this reason it is necessary to install devices used to further increase the vacuum. This is expensive and in most cases associated with a demand for additional equipment. Apart from this, the pressure of the discharged gas is not always high enough to operate the ejector in such a way that an adequate vacuum is generated. The use of compressed gas is inappropriate for reasons of cost. It is therefore necessary to find a low-cost solution for operating the ejectors at higher efficiency. It is therefore the aim of the present invention to make a gas available which is under high pressure, reasonably priced and, as far as possible, generated in the useful-gas production process and which allows to operate the ejectors in a cost-effective manner.

EP 864351 A2 describes a process for implementing a vacuum swing absorption, in which air is subdivided into an oxygen-enriched and an oxygen-depleted flow, and the vacuum for the vacuum swing absorption is generated by steam under pressure, and the pressurized steam is generated by an exothermic chemical reaction which is fed with the oxygen-enriched flow and in which the oxygen constitutes a reactant. The generation of the vacuum by the steam is carried out by at least one so-called eductor. The process is not suited for the separation of useful gases from a gas mixture as the separated oxygen-enriched gas is used for the generation of the steam. Furthermore, the separated gases are not under pressure.

BRIEF SUMMARY OF THE INVENTION

The invention achieves the aim by generating hot steam which is obtained in the useful-gas production process or the heating process and is thus under high pressure. It can be used advantageously for driving the ejectors. In an advantageous embodiment of the invention the steam in the desorbed foreign gas is condensed after having passed the ejectors. The condensed water can be recycled to the process.

The invention also includes a solution according to which the vacuum is adjusted to the respective requirements in the desorption process so that the capacity of the pressure swing unit can be optimized. It also includes a system of feed tanks which are used as buffer tanks for vacuum and desorbed gases. In this way, it is possible to configure a continuous process flow without weakening the purifying capacity of the pressure swing adsorption unit. The system for the operation of a pressure swing adsorption unit according to the present invention is very well-suited for the operation of steam reforming processes. However, the system according to the present invention is generally suitable for any process producing a reducing gas, purifying by pressure swing adsorption and making available hot flue or fuel gases which can be used to generate steam for driving an ejector.

The invention especially claims a process for the separation of foreign gases from a reducing useful gas by pressure swing adsorption, in which a suitable process yields a reducing useful gas which contains a foreign component to be absorbed or a foreign gas in addition to the reducing component, and this gas is supplied to a pressure swing adsorption unit at elevated pressure to separate adsorbable gases, which retains the gas to be absorbed in an adsorptive process and thus produces a purified useful gas, and the adsorbed gases are released again in a mixture with useful gas by depressurizing the pressure swing adsorption unit and can be further processed or removed, and after depressurization a vacuum is applied to the pressure swing adsorption unit for desorption by means of an ejector, by which the remaining adsorbed gases can be withdrawn from the pressure swing adsorption unit, and which is characterized in that the ejector is operated by steam generated by heating with the hot useful gas or with the flue gases from the heating process for the production of useful gas.

DETAILED DESCRIPTION OF THE INVENTION

The steam for the operation of the ejector can be generated in both the outlet devices for the flue gas and in the outlet device for the useful gas. The steam generation can also be carried out in both positions in the process flow whereas the resulting steam flows may then be mixed up in any order and be transported to the ejector in suitable pipes. If in one of the named positions no steam is generated, a regular cooling device may be installed as such such as an air cooler.

The invention also claims a process by which the steam used to operate the ejector can be condensed and thus recycled to the steam production process. It is also possible to supply the condensed steam to the useful-gas production process. It is theoretically possible to use the condensed steam for any purpose desired.

The process preferred for producing the useful gas is a reforming process which uses a hydrocarbonaceous feed gas in order to produce synthesis gas in a reforming process with steam at elevated temperature. The preferred hydrocarbonaceous feed gas is natural gas. It is also possible, however, to use LPG or a liquid gas. It is also possible to use naphtha or light benzines and all other fluids that can be used as a feedstock in a reforming process. After all, the ejector-operated process according to the invention can theoretically be used in all other processes for the production of reducing gases. Thus it is also possible, for example, to use a pressure swing adsorption unit according to the present invention in a process for the gasification of coal. Finally it is also possible, for example, to include the process in the production of coke-oven gas.

Depending on the process parameters the synthesis gas obtained from the production of synthesis gas may contain major amounts of carbon monoxide. Depending on the application this content in the obtained synthesis gas may be unwanted. In many cases the carbon monoxide is therefore removed from the process gas in a so-called CO conversion. In the CO conversion the carbon monoxide contained in the synthesis gas is converted by the addition of water steam into carbon dioxide by adequate processes, which can subsequently be removed from the synthesis gas by treatment in an acid-gas scrubber, for example. By the conversion hydrogen is obtained. Another suitable process for converting carbon monoxide into carbon dioxide is described in EP 1878782 A1. In an embodiment of the invention the conversion process is preceded by a synthesis gas cooling process, whereby this cooling can also be utilized as a heat exchange process or for the generation of steam. After the process step of the heat generating CO-conversion, steam may be produced and this resulting steam flow can be fed into the steam flow for the operation of the ejector. If no steam generator is earmarked behind the process step of the conversion, a regular cooling device may be employed. After these steps, a cooled and carbon monoxide free synthesis gas is obtained.

To remove the carbon dioxide completely from the synthesis gas, it is common practice to use a pressure swing adsorption unit. It is possible to install this unit alone or in connection with an acid gas scrubber of any type desired. If the portion of gases to be adsorbed is low, it is normally sufficient to provide a pressure swing adsorption unit without an upstream acid gas scrubber. The pressure swing adsorption unit used to remove the acid gas may be of simple design and charged at normal pressure so that a vacuum must only be generated for desorbing the loaded adsorbent. In an exemplary embodiment, the pressure swing adsorption unit may be operated continuously so that the adsorption of the gas to be adsorbed is achieved by nothing but the adsorption force of the adsorbent. In an advantageous and preferred embodiment, however, the pressure swing adsorption unit is operated under excess pressure to utilize the adsorption force of the adsorbent more efficiently.

Typical pressures for operating the pressure swing adsorption unit are pressures between 5 and 50 bar. To carry out the desorption, the unit is depressurised. To allow continuous operation of the process in spite of that, adsorption and desorption must take cyclic turns. For this purpose, batteries of 5 to 50 pressure swing adsorption units are usually operated side by side. The gas to be purified passes through some of the units at elevated pressure, the foreign gas being retained by the adsorbent. The purified useful gas is thus obtained. Some other units are depressurised, releasing the adsorbed gas in a mixture with the useful gas. When the vessel is subsequently evacuated, major part of the desorbed foreign gas is recovered. The pressure-relief and desorption can also be carried out by stages or steps in order to further intensify the separating efficiency of the pressure swing adsorption units.

The largest portion of the desorbed gas normally consists of the adsorbed foreign gas. Depending on the process parameters, however, it still includes major portions of unconsumed useful gas. Since this is still of a calorific value—even though reduced because of the admixed but usually incombustible foreign gas—it can be used in the incineration process for the production of the useful gas. To keep the calorific value at an adequately high level for the heating process, it is mixed with fresh fuel gas in an advantageous embodiment of the invention. To decouple the process of useful-gas production from the pressure swing adsorption process, a buffer tank for intermediate storage of the desorbed foreign gas is provided between the pressure swing adsorption vessels and the feed into the fuel gas. It is also possible, however, to discharge the desorbed gas via a flare line, for example. This may be done on a temporary or permanent basis.

In order to keep the pressure conditions in the flue gas supply line unchanged, the ejector and the pressure in the associated buffer tank are preferably controlled in such a way that the desorbed foreign gas to be fed is provided at the same or a similar pressure as the fuel gas to the heating process for the production of useful gas. If the useful gas is produced in a reforming process, the fuel gas selected is preferably natural gas. Typical fuel gas supply pressures for the incineration process are 1.2 to 5 bar. To reach this pressure, controlling devices may be installed between the buffer tank and the feed point into the fuel gas line. These may be either compressors or pressure-reducing devices. The desorbed foreign gas may be introduced either directly upstream of the incinerator by means of suitable mixing devices or into the supply line for fuel gas. The vacuum in the fuel gas supply tank can further be increased by the use of suitable devices.

In a further embodiment of the invention the generated vacuum is advantageously stored intermediately in a buffer tank. This tank is also referred to as vacuum feed tank. Thus the vacuum can be applied to the various pressure swing adsorption units according to the respective requirements. In the same way, it is also possible to reduce the vacuum step by step in order to intensify the separating efficiency of the pressure swing adsorption units.

The propellant gas for the ejector, which is steam from the heating process for the useful-gas production in the process according to the invention, can also be supplied with other gases to generate the pressure required for driving the ejector. Thus it is also possible to use pressurised foreign gases or live steam for driving the ejector. It is furthermore possible to use the useful gas or the feed gas for driving the ejector as suggested in EP 0154131 B1. In the case of the process according to the invention, these foreign gases are mixed with steam. Furthermore, it is possible to operate the ejector or ejectors temporarily with the steam generated in the process according to the invention. The steam, however, can also be mixed with foreign gas or with foreign steam or with the synthesis gas and used as a propellant for the ejector as required by the invention. This may also be done on a temporary basis.

It is also possible to support the operation of the ejector by devices generating vacuum. The foreign vacuum can be generated in any way desired, for example, by piston or diaphragm pumps generating vacuum. It is also possible to support the process in any place desired with compressors or pressure-generating pumps.

The invention also claims a device used to run the process according to the invention. The invention particularly claims a device for the separation of foreign gases from a reducing useful gas by pressure swing adsorption, which
    includes a section with a heating device for the production of the useful gas, providing that
        this section for the production of the useful gas is followed by a section with a pressure swing adsorption for the separation of foreign gases, and
        the section for pressure swing adsorption can be supplied with the vacuum required for a complete desorption via an ejector suitable for generating vacuum,
and which is characterised in that
    a steam generator is installed downstream of the heating device or the section for producing the useful gas, which uses the hot flue gas from the heating process and/or hot useful gas for the generation of hot steam, and
    the steam from the steam generator is used to operate the ejector.

The ejector to be used may be of any type desired. It may, for example, work according to the Venturi principle. However, it may also be a vacuum-generating device which uses turbines for generating a vacuum with compressed gas.

To implement the invention and for further use, a device for the condensation of the steam is installed downstream of the ejector at the outlet end. This may be a standard condenser or it may also be a heat exchanger. It is also possible to use refrigeration machines to support the condensation process. In such case, pipelines are preferably connected to the condensing device, by which the condensate can be recycled to the steam of the feed gas. It is also possible to install evaporators downstream of such a device by which the condensate can be evaporated and recycled to the useful-gas production process.

The product obtained from the condensation process is a dried and cooled desorption gas. The desorption gas obtained may contain any suitable acid gas that can be removed from the useful gas by pressure swing adsorption. Examples of acid gases that can be removed from gases by pressure swing adsorption are carbon dioxide, hydrogen sulphide, ammonia or halogenated hydrocarbons. If the desorption gas is removed, the process flow is equipped with devices which are suited to perform such task. It is also possible, for example, to install flare facilities downstream of the condensing device on the desorption gas side.

It is also possible to install a device for acid gas scrubbing upstream of the pressure swing adsorption device according to the present invention. Such scrubbing is preferably carried out with physical solvents, which can easily be regenerated by desorption and can thus be combined suitably with a pressure swing adsorption unit. An example of suitable acid gas scrubbing devices which may be installed upstream of the pressure swing adsorption system according to the present invention is mentioned in EP 968748 A2.

If the process for the production of useful gas is a steam reforming process, this may be a process according to the state of the art. An example of a steam reforming process which can be used for the production of synthesis gas is described in WO 2006/1198121 A1. If the process for the production of useful gas is a coke-oven process, this may be provided with devices according to the state of the art. An example of a device for the production of coke-oven gas is described in EP 1230321 A1.

According to the invention the process for the production of useful gas is used to generate steam. For this purpose, the device producing useful gas may be equipped with a heat exchanger which serves as a steam generator. If the useful gas is a coke-oven gas, the steam generator may be installed in the discharge line of the coke-oven gas according to an exemplary embodiment. If the useful gas is a synthesis gas from a steam reforming process, the steam generator may be installed in the discharge line of the flue gas which is obtained from the heating for the production of synthesis gas.

The synthesis gas obtained from the steam reforming process is submitted to subsequent cooling in a preferred embodiment. For this purpose, a suitable cooling device is installed. This may be an air cooler in an exemplary embodiment. It is possible to use a heat exchanger for cooling the synthesis gas for its application as useful gas, by which steam is generated. This steam, too, may be used to operate the ejector according to the present invention. It is also possible to employ a heat exchanger for the useful gas without the steam generator in the flue gas discharge line and only use the steam which is obtained when cooling the useful gas for driving the ejector.

In a preferred embodiment, a process for the conversion of the carbon monoxide into carbon dioxide is provided downstream of the process for the production of useful gas or the device for cooling the useful gas. In such case, the major portion of the acid gas to be absorbed is carbon dioxide. The CO conversion process is described in a suitable embodiment in EP 1878782 A1.

In direction of the process flow, the pressure swing adsorption unit according to the invention is arranged downstream of the CO conversion. An example of a suitable pressure swing adsorption unit with an adequate number of various pressure swing adsorption vessels is described in EP 015413 B1. This teaching describes the example of an ejector suited for the generation of a vacuum for the process according to the present invention.

According to the invention, it is also possible, to arrange a cooling device for the useful gas after the process step for the conversion of carbon monoxide. This device is constructed in an exemplary fashion as a heat exchanger or a steam generator. By this way, steam for the ejector can be produced, too. According to the invention, a steam generator can also be arranged in the outlet for the heating gas or in the outlet for the produced useful gas, which is in the process flow before the conversion unit for the carbon monoxide or in another embodiment of the invention a steam generator behind the outlet of device for the carbon monoxide conversion of the useful gas. The arrangement of the steam generators in the named positions in the process flow can also be multiple and in all possible combinations.

To run the process according to the present invention, the pressure swing adsorption units are connected to an adequate number of valves and pipelines. These are linked to the vessels of the pressure swing adsorption unit in such a way that it is possible to ensure cyclic operation of adsorption and desorption of the foreign gases. In an advantageous embodiment, a tank for buffering the vacuum can be provided downstream of the pressure swing adsorption unit allowing connection to the pressure swing adsorption unit whenever required.

A condenser may be connected to the outlet of the ejector which serves to condense the steam contained in the outlet gas. The condensate can be recycled to the process for the production of the useful gas. The desorption gas which has been freed from the steam is preferably fed to a fuel gas feed tank. From here, the desorbed foreign gas can be recycled to the process by mixing it with the fuel gas. Downstream of the ejector, there may be a device which serves to increase the vacuum of the ejector.

The device according to the invention also includes pipelines and valves which are used to interconnect and control the devices for the process according to the invention. The device according to the invention may also be provided with devices for cooling or devices for heating the gas in any place desired. The device according to the invention also includes compressors or vacuum pumps to support the process in any place of the process flow. The process according to the invention also includes thermometers, pressure gauges or other analysers and the associated control devices which serve to control the process.

The process according to the invention provides an efficient process at reasonable cost for the purification of reducing gases. In addition, it advantageously utilises the heat of the heating process in the production of useful gas. It also provides an efficient means to utilise the calorific value of the partly adsorbed gas which is polluted by foreign gas.

Figure 1:
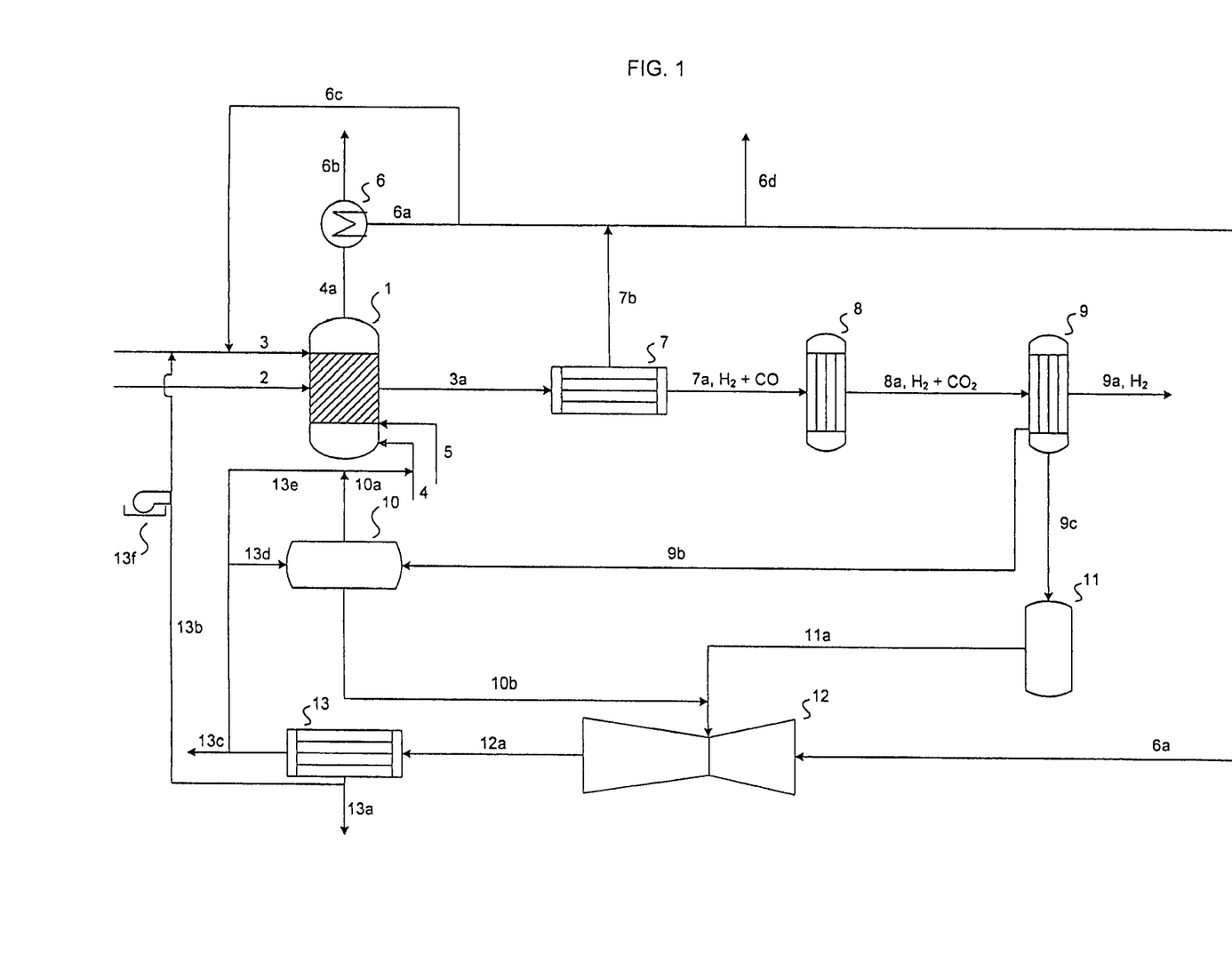
FIG. 1 shows a reforming furnace according to the present invention.
Figure 2:
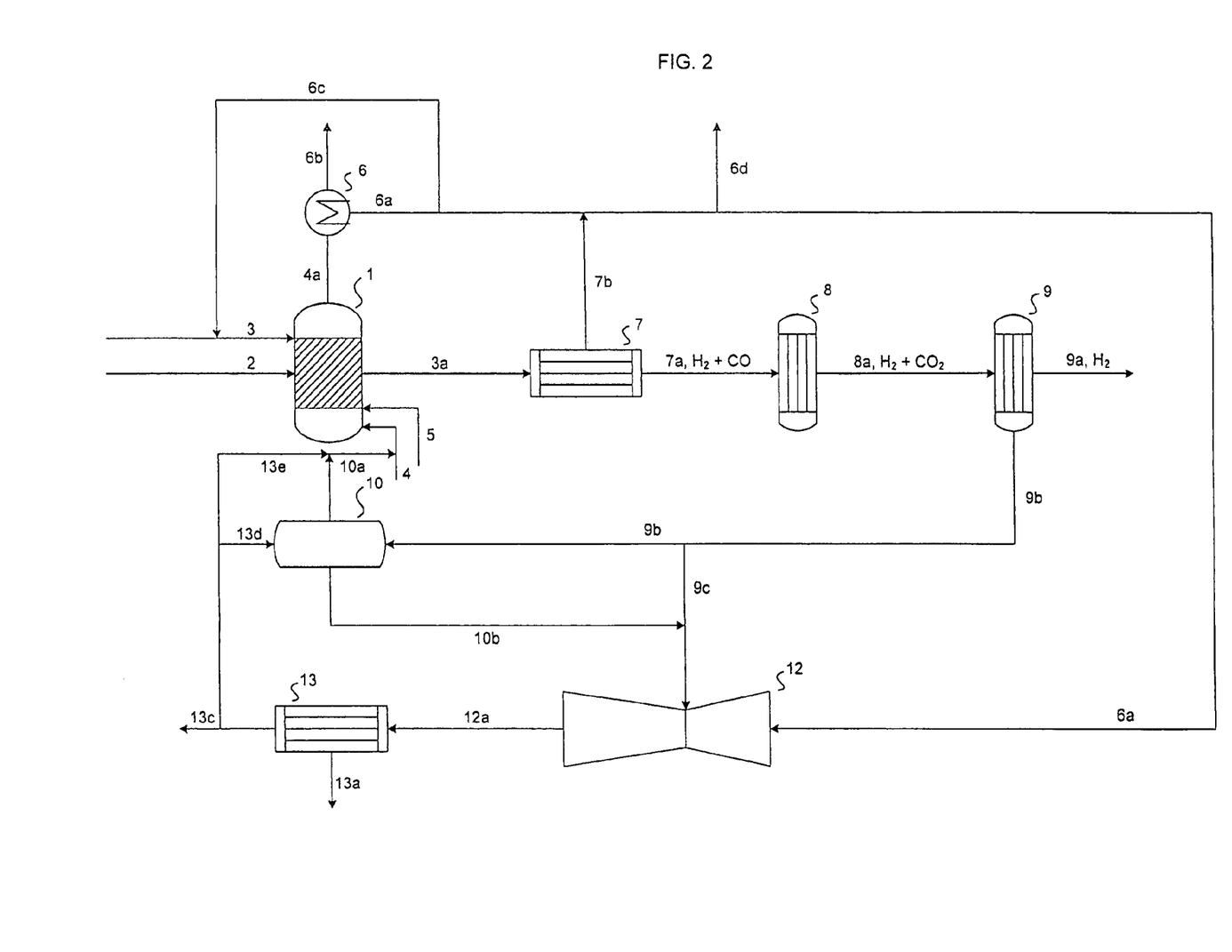
FIG. 2 shows an embodiment of the present invention without using a vacuum feed tank.

The process flow of the process according to the invention is illustrated in more detail by means of two sketches, the process according to the present invention not being limited to these embodiments. FIG. 1 and FIG. 2 show the process flow of the process according to the invention with and without vacuum feed tanks, respectively.

FIG. 1 shows the example of a reforming furnace (1) which is supplied with a hydrocarbonaceous feed gas (2) and steam (3). It is heated by means of a hydrocarbonaceous fuel gas (4) and air (5). The product obtained is synthesis gas which is represented as a mixture of hydrogen and carbon monoxide in this example. In the incineration of the fuel gas, waste gases (4a) are produced which are passed through a steam generator (6) to generate steam (6a). The waste gases are subsequently cooled and discharged as flue gases (6b). The steam may either be recycled directly to the feed gas (6c) or blown off via a valve (6d). The crude synthesis gas obtained (3a) is routed to a cooling device (7) where it is cooled and then (7a) supplied to the carbon monoxide conversion device (8). If the cooling device is a heat exchanger, it is possible to produce steam (7b) from the hot useful gas. In the CO conversion (8) the carbon monoxide (CO) contained in the crude synthesis gas is converted into carbon dioxide ($CO_2$). Synthesis gas (8a) with an excess of carbon dioxide is obtained. It is passed to the pressure swing adsorption unit (9). In this example, the carbon dioxide is removed in this unit so that a purified synthesis gas (9a) is obtained which consists of predominantly hydrogen. When the adsorption vessels are depressurised, mainly desorbed foreign gas (9b) is obtained which still contains traces of co-adsorbed synthesis gas. This gas is supplied to the feed tank for fuel gas (10). From there, it may be fed optionally to the fuel gas for the production of synthesis gas (10a). It may also be remixed (10b) with the desorption gas. For the purpose of further desorption (9c), a vacuum from a vacuum feed tank (11) is applied via a vacuum line (9c) to the pressure swing adsorption unit. The vacuum in the feed tank (11) is generated by an ejector (12) via a vacuum line (11a), which is driven by the pressurised steam (6a) from the steam generator (6). The ejector (12) generates at least major part of the vacuum in the feed tank (11). At the outlet end, the vacuum-desorbed gas (12a) is obtained which is passed into a condenser (13). Thus a condensate is obtained which may be discharged (13a), recycled to the process for the generation of steam or recycled (13b) to the steam as feed gas (2). The obtained desorption gas may be incinerated via a flare line (13c), passed (13d) to the feed tank for fuel gas (10) or directly fed to the fuel gas (13e). If the condensate is fed to the feed gas (2), it is advantageously re-evaporated by an intermediate heater (13f).

FIG. 2 shows the process according to the present invention without a vacuum feed tank. The synthesis gas is produced in a reforming furnace (1) which is supplied with a hydrocarbonaceous feed gas (2) and steam (3). It is heated with a hydrocarbonaceous fuel gas (4) and air (5). The product obtained is synthesis gas which is represented as a mixture of hydrogen and carbon monoxide in this example. In the incineration of the fuel gas, waste gases (4a) are produced which are passed through a steam generator (6) to generate steam (6a). The waste gases are subsequently cooled and discharged as flue gases (6b). The steam may either be recycled directly to the feed gas (6c) or blown off via a valve (6d). The crude synthesis gas obtained (3a) is routed to a cooling device (7) where it is cooled and then (7a) supplied to the carbon monoxide conversion device (8). If the cooling device is a heat exchanger, it is possible to produce steam (7b) from the hot useful gas. In the CO conversion (8) the carbon monoxide (CO) contained in the crude synthesis gas is converted into carbon dioxide ($CO_2$). Synthesis gas (8a) with an excess of carbon dioxide is obtained. It is passed to the pressure swing adsorption unit (9). In this example, the carbon dioxide is removed in this unit so that a purified synthesis gas (9a) is obtained which consists of predominantly hydrogen. When the adsorption vessels are depressurised, mainly desorbed foreign gas (9b) is obtained which still contains traces of co-adsorbed synthesis gas. It is desorbed and supplied to the feed tank for fuel gas (10). From there, it may be fed optionally to the fuel gas for the production of synthesis gas (10a). Upon completion of the desorption process, a vacuum is applied by means of the ejector (12) and the desorption gas is desorbed by vacuum (9c). If required, it may also be remixed with the desorption gas (10b). At the outlet end of the ejector (12), the vacuum-desorbed gas (12a) is obtained which is passed into a condenser (13). Thus a condensate (13a) is obtained. The obtained desorption gas may be incinerated via a flare line (13c), passed (13d) to the feed tank for fuel gas (10) or directly fed to the fuel gas (13e).

LIST OF REFERENCES USED

1 Reforming furnace
2 Hydrocarbonaceous feed gas
3 Steam
3a Crude synthesis gas
4 Fuel gas
4a Waste gases
5 Air
6 Heat exchanger or steam generator
6a Steam
6b Flue gas
6c Steam recycle
6d Steam blow-off valve
7 Cooling device for synthesis gas
7a Cooled synthesis gas
7b Steam
8 CO conversion
8a Synthesis gas with excess carbon dioxide
9 Pressure swing adsorption unit
9a Purified synthesis gas
9b Desorbed foreign gas
9c Vacuum line
10 Feed tank for fuel gas
10a Fuel gas supply line
10b Fuel gas return line
11 Vacuum feed tank
11a Vacuum line
12 Ejector
12a Vacuum-desorbed gas
13 Condenser
13a Condensed water or condensate
13b Condensate recycle
13c Flare line
13d Return line for dried desorption gas to feed tank
13e Return line for dried desorption gas to feed gas
13f Intermediate heater

The invention claimed is:

1. A process for the separation of foreign gases from a reducing useful gas by pressure swing adsorption, in which:
    a suitable process yields a reducing useful gas which contains a foreign component to be absorbed or a foreign gas in addition to the reducing component, and
    this gas is supplied to a pressure swing adsorption unit at elevated pressure to separate adsorbable gases, which retains the gas to be absorbed in an adsorptive process and thus produces a purified useful gas, and
    the adsorbed gases are released again in a mixture with useful gas by depressurizing the pressure swing adsorption unit and can be further processed or removed,
    after depressurization a vacuum is applied to the pressure swing adsorption unit for desorption by means of an ejector, by which the remaining adsorbed gases are withdrawn from the pressure swing adsorption unit, wherein
    the ejector is operated by steam generated by heating with the hot useful gas or with the flue gases from a heating process for the production of useful gas.

2. The process according to claim 1, wherein the steam is condensed by a suitable device downstream of the ejector, the condensed water being recycled to the process for the production of useful gas or to the steam generator for the operation of the ejector.

3. The process according to claim 1, wherein
    the useful gas is synthesis gas and the process used to produce the useful gas is a steam reforming process, and
    the process gas used in the production of synthesis gas is a mixture of natural gas or light hydrocarbons and steam.

4. The process according to claim 1, wherein downstream of the process for the production of useful gas and upstream of the pressure swing adsorption the carbon monoxide is converted by means of steam to give carbon dioxide and hydrogen.

5. The process according to claim 1, wherein in that the gas desorbed in the pressure swing adsorption unit is used as fuel gas in the production of useful gas or mixed with fresh fuel gas and then used as fuel gas in the production of useful gas, the gas desorbed and withdrawn by the ejector being made available at the same pressure at which the fuel gas is fed to an incineration process for the production of useful gas by adjusting the ejector appropriately or providing suitable devices.

6. The process according to claim 1, wherein, before being recycled to the heating process for the production of useful gas, the desorbed gas is passed to a feed tank which can be used to store the desorbed gas or the desorbed gas in a mixture with a fuel gas.

7. The process according to claim 1, wherein:
    the desorption in the pressure swing adsorption unit is performed in two stages, the desorption being carried out by depressurizing the pressure swing adsorption unit first and then applying a vacuum,
    the vacuum for the desorption in the pressure swing adsorption unit and the desorbed gas are stored in a feed tank, and
    the vacuum produced by the ejector can be increased by an additional vacuum-generating device at any point of the process flow or the vacuum in the feed tank can be increased.

8. The process according to claim 1, wherein the ejector is operated temporarily or partly or temporarily and partly with a foreign gas or the synthesis gas or a mixture of both gases, the foreign gas consisting completely or partly of steam from an external source.

9. A device for the separation of foreign gases from a reducing useful gas by pressure swing adsorption, comprising:
- a section with a heating device for the production of the useful gas;
- the section for the production of the useful gas is followed by a section with a pressure swing adsorption for the separation of foreign gases; and
- the section for pressure swing adsorption is supplied with the vacuum required for a complete desorption via an ejector suitable for generating vacuum;
- further comprising
- a steam generator downstream of the heating device or the section for producing the useful gas, which uses the hot flue gas and or hot useful gas from the heating process for the generation of hot steam; wherein
- steam from the steam generator is used to operate the ejector.

10. The device according to claim 9, comprising a device for the condensation of the steam used to operate the ejector installed in the driving-end discharge line of the ejector, pipelines being connected to the condensing device, which serve to recycle the condensate as feed component to the useful-gas production process.

11. The device according to claim 9, comprising a device for the conversion of carbon monoxide installed downstream of the useful-gas production device, which converts the carbon monoxide contained in the reducing useful gas to give a mixture of carbon dioxide and hydrogen.

12. The device according to claim 11, comprising a useful-gas cooling device between the useful-gas production section and the device for the conversion of carbon monoxide, the cooling device for the useful gas being a steam generator.

13. The device according to claim 11, comprising a useful-gas cooling device downstream of the device for the conversion of the carbon monoxide, the useful-gas cooling device downstream of the device for the conversion of the carbon monoxide being a steam generator.

14. The device according to claim 9, comprising a feed tank for the generated vacuum installed downstream of the pressure swing adsorption unit on the suction side of the ejector.

15. The device according to claim 9, comprising a feed tank for fuel gas installed downstream of the pressure swing adsorption unit, which can also be supplied with the desorbed foreign gas via the outlet end of the ejector or via pipelines from a condenser downstream of the ejector.

16. The device according to claim 9, comprising a device installed downstream of the ejector on the suction side, which produces vacuum so that the vacuum produced by the ejector can be intensified.

* * * * *

UNITED STATES PATENT AND TRADEMARK OFFICE
CERTIFICATE OF CORRECTION

PATENT NO. : 8,361,198 B2  Page 1 of 1
APPLICATION NO. : 12/736046
DATED : January 29, 2013
INVENTOR(S) : Von Trotha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this
First Day of September, 2015

Michelle K. Lee
*Director of the United States Patent and Trademark Office*